(12) United States Patent
Li et al.

(10) Patent No.: US 10,764,507 B1
(45) Date of Patent: Sep. 1, 2020

(54) IMAGE PROCESSING SYSTEM CAPABLE OF GENERATING A SNAPSHOT IMAGE WITH HIGH IMAGE QUALITY BY USING A ZERO-SHUTTER-LAG SNAPSHOT OPERATION

(71) Applicant: Kneron (Taiwan) Co., Ltd., Taipei (TW)

(72) Inventors: Hsiang-Tsun Li, Taichung (TW); Bike Xie, San Diego, CA (US); Junjie Su, San Diego, CA (US); Yi-Chou Chen, Hsinchu County (TW)

(73) Assignee: Kneron (Taiwan) Co., Ltd., Taipei (TW)

( * ) Notice: Subject to any disclaimer, the term of this patent is extended or adjusted under 35 U.S.C. 154(b) by 0 days.

(21) Appl. No.: 16/387,565

(22) Filed: Apr. 18, 2019

(51) Int. Cl.
*H04N 5/235* (2006.01)
*H04N 5/217* (2011.01)
*H04N 9/04* (2006.01)
*H04N 5/347* (2011.01)
*H04N 5/232* (2006.01)
*H04N 5/243* (2006.01)

(52) U.S. Cl.
CPC ......... *H04N 5/2355* (2013.01); *H04N 5/2173* (2013.01); *H04N 5/232411* (2018.08); *H04N 5/243* (2013.01); *H04N 5/347* (2013.01); *H04N 9/04515* (2018.08); *H04N 9/04551* (2018.08)

(58) Field of Classification Search
CPC .. H04N 5/23232; H04N 5/2355; H04N 5/243; H04N 5/23293; H04N 5/232935; H04N 9/045–04563
See application file for complete search history.

(56) References Cited

U.S. PATENT DOCUMENTS

| 2007/0024931 A1* | 2/2007 | Compton | H04N 9/045 358/512 |
| 2010/0026839 A1* | 2/2010 | Border | G06T 3/4053 348/231.2 |
| 2016/0080653 A1* | 3/2016 | Kim | G06T 3/4053 348/216.1 |

(Continued)

FOREIGN PATENT DOCUMENTS

| CN | 104954656 B | 8/2018 |
| EP | 2806639 A1 | 11/2014 |

(Continued)

*Primary Examiner* — Paul M Berardesca
(74) *Attorney, Agent, or Firm* — Winston Hsu

(57) ABSTRACT

An image processing system includes an image capturing device, a pixel binning device, a temporal filter, a first memory, a re-mosaic device, a second memory, and a blending device. The image capturing device is used for capturing a raw image. The pixel binning device is coupled to the image capturing device for outputting an enhanced image according to the raw image. The temporal filter is coupled to the pixel binning device for outputting a preview image according to the enhanced image. The first memory is used for buffering the raw image. The re-mosaic device is coupled to the first memory for outputting a processed image. The second memory is used for buffering the enhanced image. The blending device is coupled to the re-mosaic device and the second memory for outputting a snapshot image according to the processed image and the enhanced image.

20 Claims, 5 Drawing Sheets

(56) References Cited

U.S. PATENT DOCUMENTS

| | | | | |
|---|---|---|---|---|
| 2016/0086309 A1* | 3/2016 | Hsu | ............... | G06T 3/4015 |
| | | | | 382/162 |
| 2016/0373637 A1* | 12/2016 | Zhou | ............... | G06K 9/6215 |
| 2017/0332022 A1* | 11/2017 | Zhou | ............... | H04N 5/347 |
| 2019/0141299 A1* | 5/2019 | Siddiqui | ............... | H04N 5/2355 |
| 2019/0222738 A1* | 7/2019 | Galor Gluskin | ............... | H04N 5/2355 |

FOREIGN PATENT DOCUMENTS

| | | | |
|---|---|---|---|
| TW | I538506 B | 6/2016 |
| TW | 201808007 A | 3/2018 |
| TW | 201817239 A | 5/2018 |
| TW | 201832179 A | 9/2018 |
| TW | I638336 B | 10/2018 |

\* cited by examiner

IMAGE PROCESSING SYSTEM CAPABLE OF GENERATING A SNAPSHOT IMAGE WITH HIGH IMAGE QUALITY BY USING A ZERO-SHUTTER-LAG SNAPSHOT OPERATION

BACKGROUND OF THE INVENTION

1. Field of the Invention

The present invention discloses an image processing system, and more particularly, an image processing system capable of generating a snapshot image with high image quality by using a zero-shutter-lag snapshot operation.

2. Description of the Prior Art

With advancement of photography technologies, various photo sensors and image processing algorithms are adopted in recent years. For example, when a camera captures an image in a dark scene, the image may become an under exposed image. Since a signal-to-noise ratio (SNR) of the under exposed image is low, noise (i.e., thermal noise or granularity noise) becomes severe and may be randomly distributed in the under exposed image. In order to provide satisfactory image quality in the dark scene, some new Bayer formats are proposed and applied to advanced photo sensors. As known in the art, a Bayer filter can be regarded as a color filter array (CFA) including a plurality of primary color (RGB) filters on square grids of photo sensors. However, in the new Bayer formats, a CFA can include 2×2 Bayer patterns, such as RYYB (red/yellow/yellow/blue) color filters. A purpose of introducing the new Bayer formats is to improve the SNR of a video or an image captured in the dark scene.

Unfortunately, most current image signal processors (ISP) are not compatible with image data having the new Bayer formats. Further, although the Bayer filter can improve the SNR of the image, an image resolution or color fidelity is reduced since a mosaic process is applied to CFA for reducing noise. In other words, for the image captured by the camera, it is a trade-off between an SNR improvement and resolution maintenance when the image is processed. Therefore, to develop an image processing system for converting new Bayer formats to standard Bayer formats and to provide high image quality without sacrificing image is an important issue.

SUMMARY OF THE INVENTION

In an embodiment of the present invention, an image processing system is disclosed. The image processing system comprises an image capturing device, a pixel binning device, a temporal filter, a first memory, a re-mosaic device, a second memory, and a blending device. The image capturing device is configured to capture a raw image with a first resolution. The pixel binning device is coupled to the image capturing device and configured to output an enhanced image with a second resolution according to the raw image. The temporal filter is coupled to the pixel binning device and configured to output a preview image with the second resolution according to the enhanced image. The first memory is coupled to the image capturing device and configured to buffer the raw image. The re-mosaic device is coupled to the first memory and configured to output a processed image with the first resolution. The second memory is coupled to the temporal filter and configured to buffer the enhanced image. The blending device is coupled to the re-mosaic device and the second memory and configured to output a snapshot image with the first image resolution according to the processed image and the enhanced image. The image capturing device, the pixel binning device, and the temporal filter are always enabled. The re-mosaic device and the blending device are optionally enabled according to a snapshot signal. The first resolution is greater than the second resolution.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
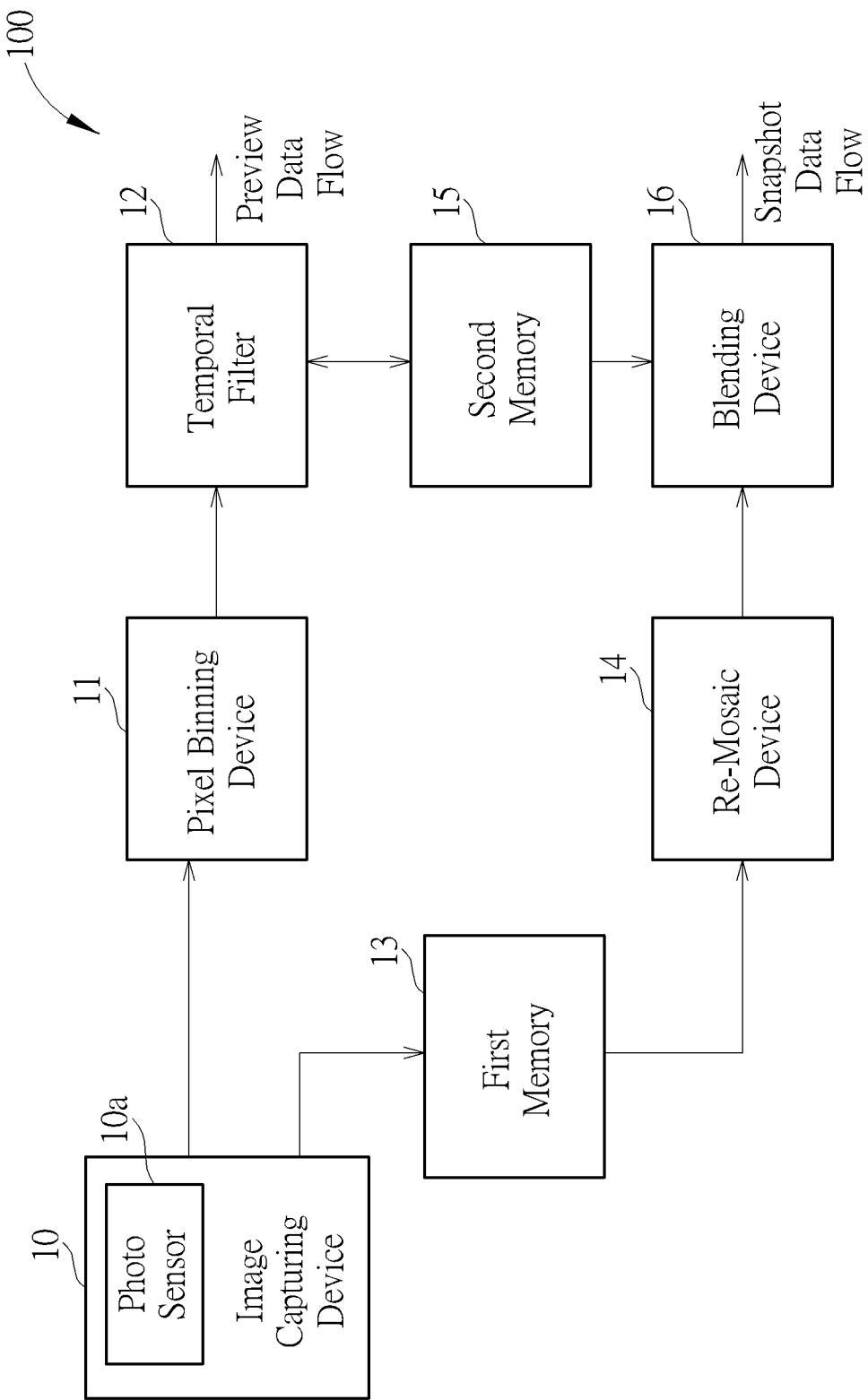
FIG. 1 is a block diagram of an image processing system according to an embodiment of the present invention.
Figure 2:
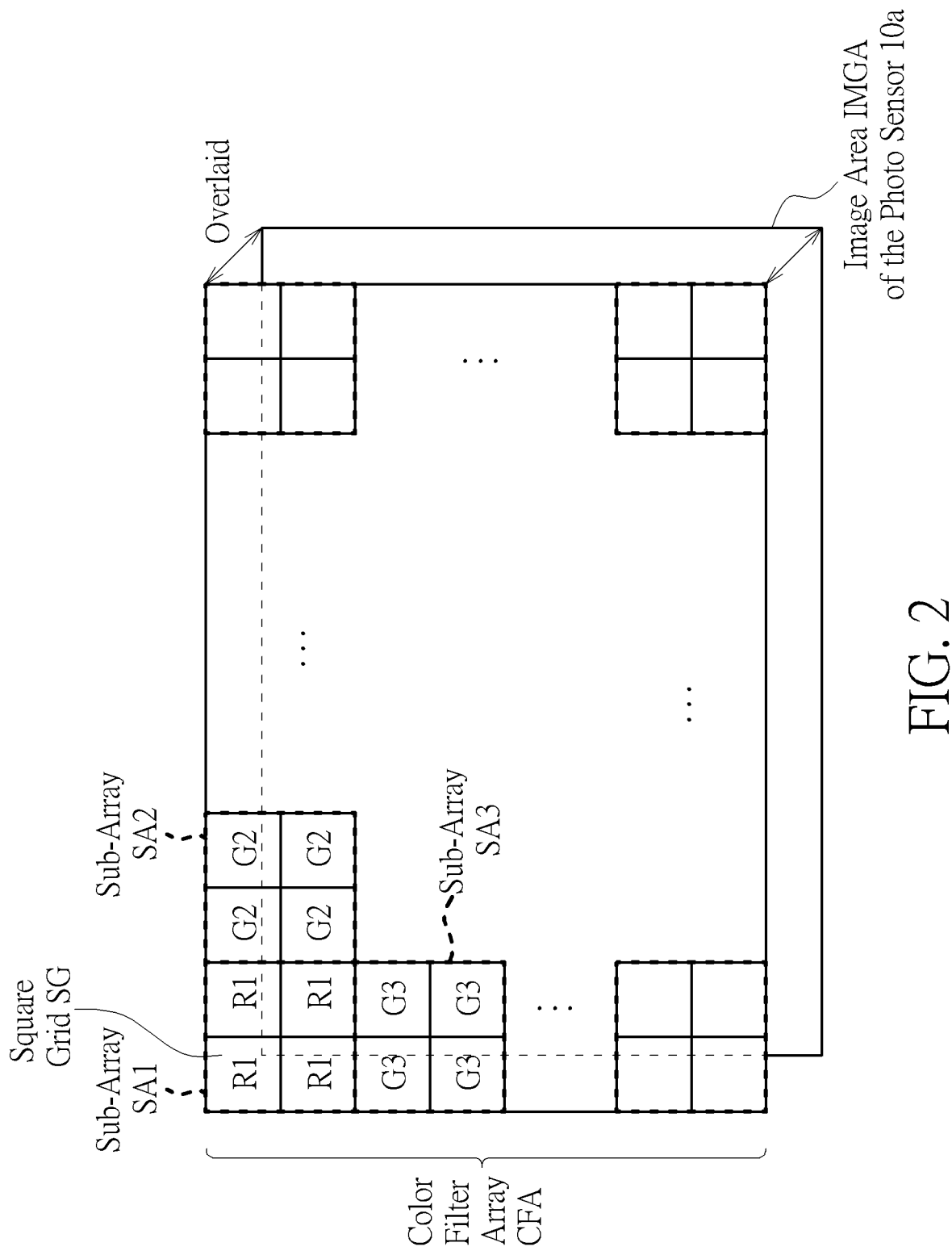
FIG. 2 is an illustration of Bayer patterns of an image capturing device in the image processing system in FIG. 1.

FIG. 1 is a block diagram of an image processing system 100 according to an embodiment of the present invention. FIG. 2 is an illustration of Bayer patterns of an image capturing device 10 in the image processing system 100. The image processing system 100 can be regarded as a "preprocessing" system compatible with any type of Bayer patterns. The image processing system 100 is capable of performing a zero-shutter-lag snapshot operation. The image processing system 100 includes an image capturing device 10, a pixel binning device 11, a temporal filter 12, a first memory 13, a re-mosaic device 14, a second memory 15, and a blending device 16. The image capturing device 10 can be used for capturing a raw image with a first resolution. The image capturing device 10 can be any optical sensing device with a photo sensor 10a, such as a lens with a complementary metal-oxide-semiconductor (CMOS) or a camera with a charge-coupled device (CCD). In the image processing system 100, a Bayer filter can be applied to the photo sensor 10a. The Bayer filter can be regarded as a color filter array (CFA) including a plurality of primary color (RGB) filters on square grids of the photo sensor 10a. For example, in FIG. 2, the image capturing device 10 can generate Bayer patterns in form of a color filter array CFA overlaid on the photo sensor 10a of the image capturing device 10. The color filter array CFA includes a plurality of sub-arrays, such as a sub-array SA1, a sub-array SA2, and a sub-array SA3. Each sub-array includes N×N square grids SG of identical primary color filters. N is a positive integer greater than one. For example, the sub-array SA1 can include 2×2 square grids of "red" color filters. In other words, the sub-array SA1 can include 4-cell "red" color square grids, denoted as R1. The sub-array SA2 can include 2×2 square grids of "green" color filters. In other words, the sub-array SA2 can include 4-cell "green" color square grids, denoted as G2. The sub-array SA3 can include 2×2 square grids of "green" color filters. In other words, the sub-array SA3 can include 4-cell "green" color square grids, denoted as G3. Therefore, square grids SG of a first row of the color filter array CFA correspond to a sequence of primary color filters as "R1R1G2G2 . . . ". Similarly, square grids SG of a first column of the color filter array CFA correspond to a sequence of primary color filters as "R1R1G3G3 . . . ". Since the color filter array CFA can be overlaid on an image area IMGA of the photo sensor 10a, the photo sensor 10a can detect at least one color light intensity with corresponding wavelength specificity. Therefore, the photo sensor 10a can separate different colors information (i.e., different primary colors information). However, allocations of the Bayer patterns in the image processing system 100 can be reasonably modified. Any non-standard or standard Bayer patterns application falls into the scope of the present invention.

The pixel binning device 11 is coupled to the image capturing device 10 for outputting an enhanced image with a second resolution according to the raw image. For example, the pixel binning device 11 can combine information of a part of square grids SG and generate standard Bayer patterns in order to generate the enhanced image with the second resolution. Here, since the information of the part of square grids SG can be combined, a noise variance of the raw image can be reduced, leading to a signal-to-noise ratio (SNR) improvement. In other words, an SNR of the enhanced image is greater than an SNR of the raw image. Further, since the pixel binning device 11 can reallocate any non-standard Bayer patterns to generate the enhanced image, the enhanced image has a standard Bayer format. The standard Bayer format can be defined as a sub-array of the color filter array CFA including RGBG, GRGB, or RGGB color filters (Bayer patterns). Therefore, the enhanced image having the standard Bayer format can be compatible with the most current image signal processors (ISP). The temporal filter 12 is coupled to the pixel binning device 11 for outputting a preview image with the second resolution according to the enhanced image. For example, the temporal filter 12 can perform a convolution of the enhanced image data with a predetermined impulse response for smoothing random fluctuations of noise of the enhanced image. Therefore, noise of the enhanced image can be reduced, especially in an under exposure condition. In other words, the temporal filter 12 can output the preview image with reduced noise. The preview image can be regarded as a thumbnail image. The first memory 13 is coupled to the image capturing device 10 for buffering the raw image. The first memory 13 can be a random access memory (RAM). The re-mosaic device 14 is coupled to the first memory 13 for outputting a processed image with the first resolution. For example, similar to the pixel binning device 11, the re-mosaic device 14 can be used for combining information of a part of square grids and generating standard Bayer patterns. Further, in order to avoid resolution loss, the re-mosaic device 14 can interpolate square grids of the standard Bayer patterns for generating the processed image with the first resolution. Therefore, the processed image outputted from the re-mosaic device 14 has the standard Bayer format. Further, the resolution of the processed image outputted from the re-mosaic device 14 can be maintained (i.e., equal to the first resolution of the raw image). The second memory 15 is coupled to the temporal filter 12 for buffering the enhanced image. The second memory 15 can be a random access memory. The blending device 16 is coupled to the re-mosaic device 14 and the second memory 15 for outputting a snapshot image with the first image resolution according to the processed image and the enhanced image. For example, the blending device 16 can be used for improving the SNR of the processed image by fusing information of the enhanced image buffered in the second memory 15 with information of the processed image outputted from the re-mosaic device 14. In practice, the snapshot image has a Joint Photographic Experts Group (JPEG) format. The blending device 16 can be used for fusing direct current (DC) JPEG coefficients of the enhanced image with the alternating current (AC) JPEG coefficients of the processed image to generate the snapshot image. After the information of the enhanced image buffered in the second memory 15 is fused with the information of the processed image, the blending device 16 can output the snapshot image with the first image resolution (i.e., resolutions of the snapshot image and the raw image are identical). The SNR of the snapshot image is greater than the SNR of the raw image.

In the image processing system 100, the image capturing device 10, the pixel binning device 11, and the temporal filter 12 are always enabled. The re-mosaic device 14 and the blending device 16 are optionally enabled according to a snapshot signal controlled by a user. The first resolution is greater than the second resolution. In other embodiments, the temporal filter 12 and the blending device can be omitted for reducing hardware complexity and power consumption. Any reasonable hardware modification falls into the scope of the present invention. In the image processing system 100, the pixel binning device 11 can be a hardware core module. The re-mosaic device 14 can be a programmable core module. Further, since the image capturing device 10, the pixel binning device 11, and the temporal filter 12 are always enabled, the raw image buffered in the first memory 13 can be generated in real time. The preview image buffered in the second memory 15 can be generated according to the raw image in real time. Therefore, the re-mosaic device 14 and the blending device 16 can generate the snapshot image by accessing the raw image buffered in the first memory 13 and the enhanced image buffered in the second memory 15 in real time. In other words, the re-mosaic device 14 and the blending device 16 can support a zero-shutter-lag (ZSL) snapshot operation.

Figure 3:
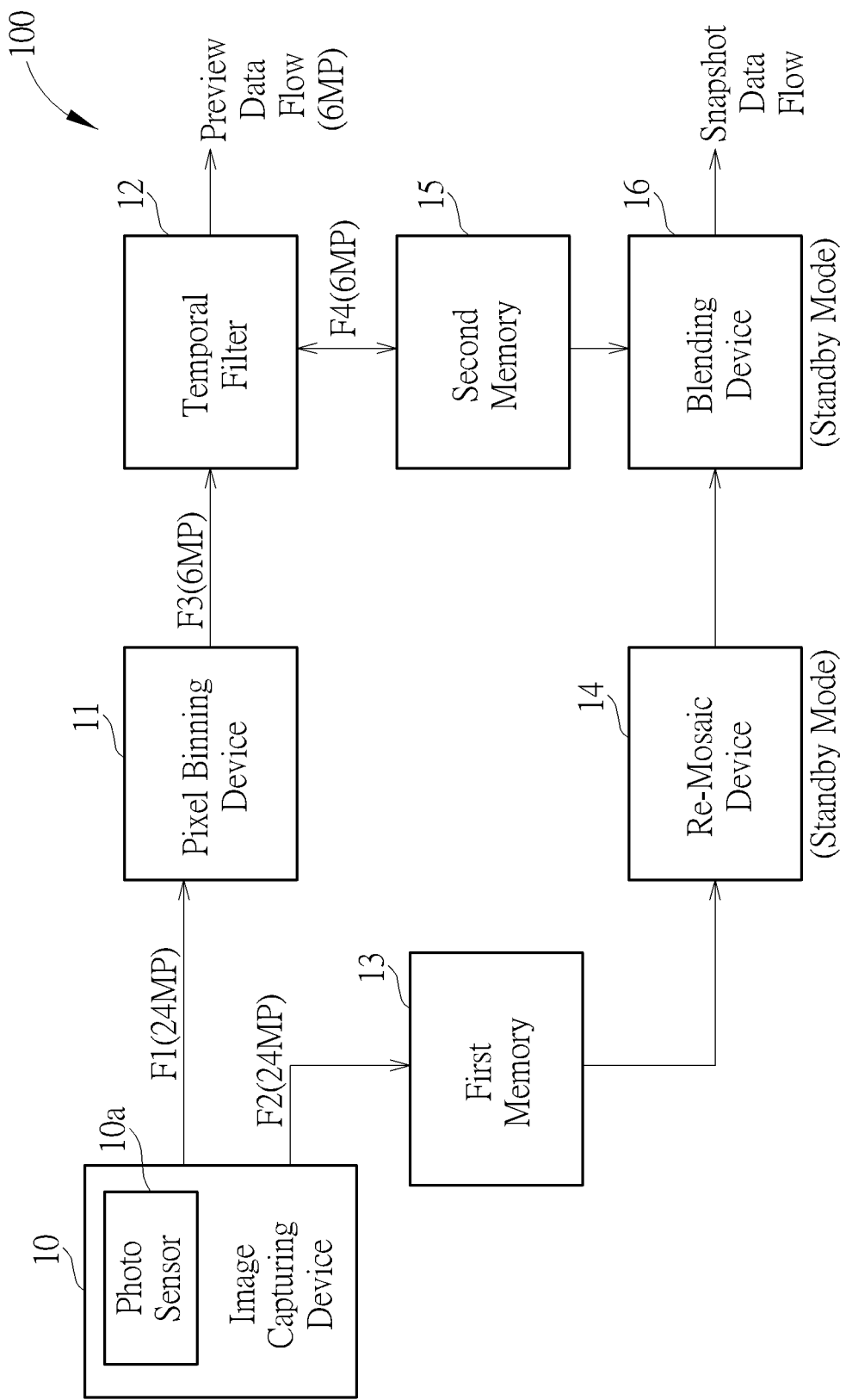
FIG. 3 is an illustration of the re-mosaic device and the blending device entering a standby mode of the image processing system in FIG. 1.

FIG. 3 is an illustration of the re-mosaic device 14 and the blending device 16 entering a standby mode of the image processing system 100. In the image processing system 100, after the re-mosaic device 14 and the blending device 16 are idled for a predetermined time length (i.e., for example, couple of seconds), the re-mosaic device 14 and the blending device 16 can enter the standby mode. For example, after the snapshot signal is absent for 5 seconds, the re-mosaic device 14 and the blending device 16 can enter the standby mode for avoiding additional power consumption. Here, the first image resolution is an original resolution of the photo sensor 10a of the image capturing device 10. The second resolution is a thumbnail resolution. For example, the first image resolution can be substantially equal to 24M (Mega) pixels. The second resolution can be substantially equal to 6M (Mega) pixels. The image capturing device 10 generates a first data flow F1 (24M per frame) of the raw image to the pixel binning device 11. The image capturing device 10 generates a second data flow F2 (24M per frame) of the raw image to the first memory 13. The pixel binning device 11 can receive the first data flow F1 of the raw image and generate a third data flow F3 (6M per frame) of the enhanced image. The temporal filter 12 can receive the third data flow F3 of the enhanced image and generates a fourth data flow F4 (6M per frame) of the preview image to the second memory 15. As previously mentioned, since the preview image has the standard Bayer format, the preview image can be directly processed by the most current image signal processors (ISP) or can be displayed on a screen through a preview data flow (6M per frame). Further, since the re-mosaic device 14 and the blending device 16 enter the standby mode for avoiding additional power consumption, an operation endurance of the image processing system 100 can be increased.

Figure 4:
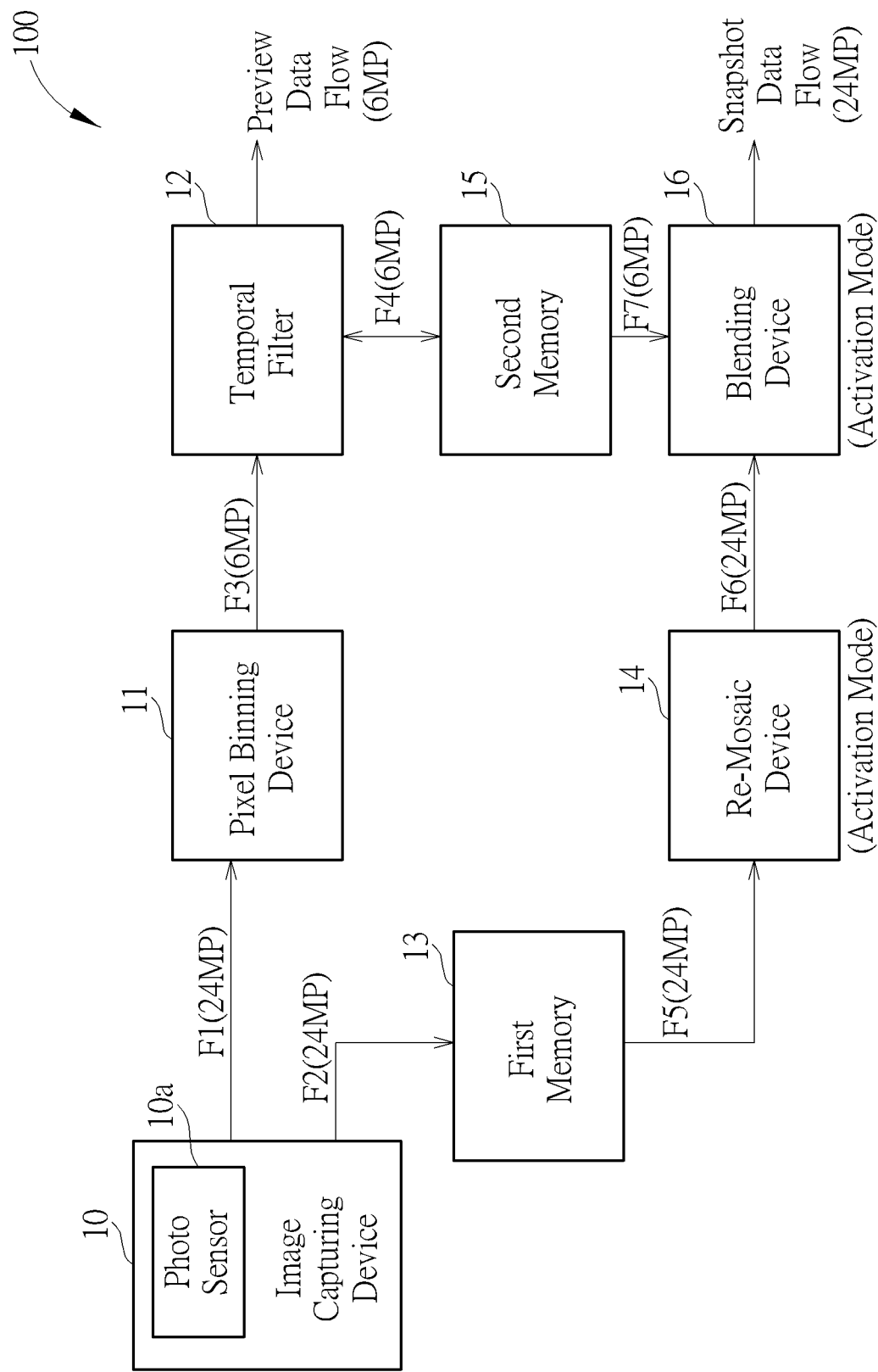
FIG. 4 is an illustration of the re-mosaic device and the blending device entering an activation mode of the image processing system in FIG. 1.

FIG. 4 is an illustration of the re-mosaic device 14 and the blending device 16 entering an activation mode of the image processing system 100. In the image processing system 100, after the snapshot signal triggers the re-mosaic device 14 and the blending device 16, the re-mosaic device 14 and the blending device 16 enter the activation mode. For example, when the user presses a shutter key, the snapshot signal can be generated. In the image processing system 100, the first data flow F1, the second data flow F2, the third data flow F3, and the fourth data flow F4 are illustrated previously, Thus, their illustrations are omitted here. After the snapshot signal triggers the re-mosaic device 14 and the blending device 16, the re-mosaic device 14 can access the raw image buffered in the first memory through a fifth data flow F5 (24M per frame). The re-mosaic device 14 can generate a sixth data flow F6 (24M per frame) of the processed image. The blending device 16 can receive the sixth data flow F6 of the processed image and a seventh data flow F7 (6M per frame) of the preview image simultaneously and generate a snapshot data flow (24M per frame) of the snapshot image. As previously mentioned, since the snapshot image has the standard Bayer format, the snapshot image can be directly processed by the most current image signal processors (ISP) or can be displayed on a screen through the snapshot data flow. Further, since the fifth data flow F5 of the raw image and the seventh data flow F7 of the preview image can be processed in real time, the re-mosaic device 14 and the blending device 16 can support the zero-shutter-lag (ZSL) snapshot operation.

Figure 5:
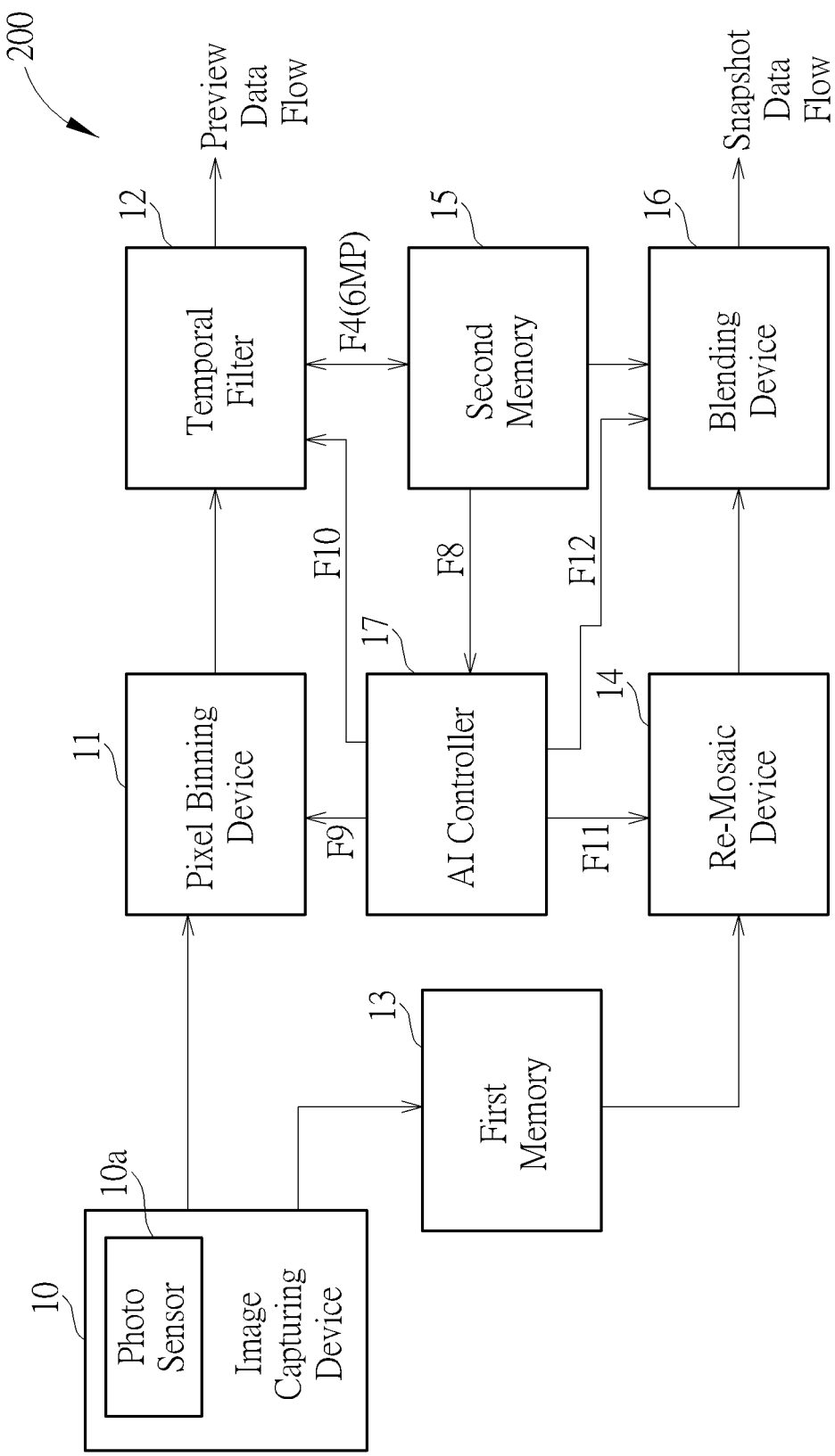
FIG. 5 is an illustration of introducing an artificial intelligence controller to the image processing system in FIG. 1.

FIG. 5 is an illustration of introducing an artificial intelligence (AI) controller 17 to the image processing system 100. For avoiding ambiguity, the image processing system including the AI controller 17 is denoted as an image processing system 200 hereafter. In the image processing system 200, the AI controller 17 is coupled to the pixel binning device 11, the temporal filter 12, the re-mosaic device 14, the blending device 16, and the second memory 15 for controlling the pixel binning device 11, the temporal filter 12, the re-mosaic device 14, and the blending device 16. For example, in FIG. 5, the AI controller 17 can receive an eighth data flow F8 of the preview image buffered in the second memory 15. As previously mentioned, the preview image has the high SNR (i.e., satisfactory image quality), especially in the under exposure condition or in the dark scene. Therefore, when the AI controller 17 uses a "neat" preview image for performing a machine learning by training a neural network of the AI controller 17, performance of the machine learning speed and accuracy can be improved. Then, the AI controller 17 can be used for optimizing operations of the pixel binning device 11, the temporal filter 12, the re-mosaic device 14, and the blending device 16 according to the enhanced image buffered in the second memory 15. In practice, the AI controller 17 can generate a plurality of control signals for optimizing operations of the image processing system 200. For example, the AI controller 17 can generate a ninth data flow F9 to the pixel binning device 11 for optimizing the pixel binning device 11. The AI controller 17 can generate a tenth data flow F10 to the temporal filter 12 for optimizing the temporal filter 12. The AI controller 17 can generate an eleventh data flow F11 to the re-mosaic device 14 for optimizing the re-mosaic device 14. The AI controller 17 can generate a twelfth data flow F12 to the blending device 16 for optimizing the blending device 16. By introducing the AI controller 17 to the image processing system 200, the quality of the preview image and the quality of the snapshot image can be further improved.

To sum up, the present invention discloses an image processing system. The image processing system can be regarded as an AI aided Bayer image pre-processing system capable of generating a snapshot image with high image quality by using a zero-shutter-lag operation. The image processing system can convert any type of non-standard Bayer patterns to the standard Bayer patterns. Therefore, image data flows having the standard Bayer format can be compatible with most current image signal processors (ISP). Further, the image processing system can output the snapshot image having a high SNR without sacrificing image resolution. In other words, the image processing system can intelligently determine an optimal SNR for capturing the raw image in the dark scene. Therefore, even if the raw image is captured in dark scene, quality of the snapshot image is similar to a snapshot image processed from a raw image captured in the light scene by using standard Bayer patterns. Thus, the image processing system can output the snapshot image with high quality. Further, the image processing system can also process the raw image for outputting the preview image and the snapshot image in real time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing system comprising:
    an image capturing device configured to capture a raw image with a first resolution;
    a pixel binning device coupled to the image capturing device and configured to output an enhanced image with a second resolution according to the raw image;
    a temporal filter coupled to the pixel binning device and configured to output a preview image with the second resolution according to the enhanced image;
    a first memory coupled to the image capturing device and configured to buffer the raw image;
    a re-mosaic device coupled to the first memory and configured to output a processed image with the first resolution;
    a second memory coupled to the temporal filter and configured to buffer the enhanced image; and
    a blending device coupled to the re-mosaic device and the second memory and configured to output a snapshot image with the first image resolution according to the processed image and the enhanced image;
    wherein the image capturing device, the pixel binning device, and the temporal filter are always enabled, the re-mosaic device and the blending device are optionally enabled according to a snapshot signal, and the first resolution is greater than the second resolution.

2. The system of claim 1, wherein the image capturing device is configured to generate Bayer patterns in form of a color filter array overlaid on a photo sensor of the image capturing device, the color filter array comprises a plurality of sub-arrays, each sub-array comprises N×N square grids of identical primary color filters, and N is a positive integer greater than one.

3. The system of claim 2, wherein the Bayer patterns are four-cell based Bayer patterns, and the each sub-array comprises 2×2 square grids.

4. The system of claim 2, wherein the pixel binning device is configured to combine information of a part of square grids and generate standard Bayer patterns in order to generate the enhanced image with the second resolution, and the enhanced image has a standard Bayer format.

5. The system of claim 2, wherein the re-mosaic device is configured to combine information of a part of square grids, generate standard Bayer patterns, and interpolate square grids of the standard Bayer patterns in order to generate the processed image with the first resolution, and the processed image has a standard Bayer format.

6. The system of claim 1, wherein a signal-to-noise ratio (SNR) of the enhanced image is greater than a signal-to-noise ratio (SNR) of the raw image.

7. The system of claim 1, wherein the temporal filter is configured to perform a noise reduction function by smoothing random fluctuations of noise of the enhanced image under an under exposure condition.

8. The system of claim 1, wherein the blending device is configured to improve a signal-to-noise ratio (SNR) of the processed image by fusing information of the enhanced image buffered in the second memory with information of the processed image according to the processed image and the enhanced image.

9. The system of claim 8, wherein after the information of the enhanced image buffered in the second memory is fused with the information of the processed image, the blending device outputs the snapshot image with the first image resolution, and a signal-to-noise ratio (SNR) of the snapshot image is greater than a signal-to-noise ratio (SNR) of the raw image.

10. The system of claim 1, wherein the first image resolution is an original resolution of a photo sensor of the image capturing device, the second resolution is a thumbnail resolution, the first image resolution is substantially equal to 24M (Mega) pixels, and the second resolution is substantially equal to 6M (Mega) pixels.

11. The system of claim 1, wherein the re-mosaic device and the blending device support a zero-shutter-lag (ZSL) snapshot operation.

12. The system of claim 1, wherein the enhanced image and the preview image are generated according to the raw image in real time.

13. The system of claim 1, wherein after the re-mosaic device and the blending device are idled for a predetermined time length, the re-mosaic device and the blending device enter a standby mode, after the snapshot signal triggers the re-mosaic device and the blending device, the re-mosaic device and the blending device enter an activation mode.

14. The system of claim 1, wherein the pixel binning device is a hardware core module, and the re-mosaic device is a programmable core module.

15. The system of claim 1, wherein the snapshot image has a Joint Photographic Experts Group (JPEG) format, and the blending device is configured to fuse direct current (DC) JPEG coefficients of the enhanced image with the alternating current (AC) JPEG coefficients of the processed image to generate the snapshot image.

16. The system of claim 1, further comprising:
an artificial intelligence controller coupled to the pixel binning device, the temporal filter, the re-mosaic device, the blending device, and the second memory and configured to control the pixel binning device, the temporal filter, the re-mosaic device, and the blending device.

17. The system of claim 16, wherein the artificial intelligence controller is configured to optimize operations of the pixel binning device, the temporal filter, the re-mosaic device, and the blending device according to the enhanced image buffered in the second memory.

18. The system of claim 16, wherein the blending device is configured to improve a signal-to-noise ratio (SNR) of the processed image by fusing information of the enhanced image buffered in the second memory with information of the processed image according to the processed image and the enhanced image.

19. The system of claim 18, wherein after the information of the enhanced image buffered in the second memory is fused with the information of the processed image, the blending device outputs the snapshot image with the first image resolution, and a signal-to-noise ratio (SNR) of the snapshot image is greater than a signal-to-noise ratio (SNR) of the raw image.

20. The system of claim 16, wherein after the re-mosaic device and the blending device are idled for a predetermined time length, the re-mosaic device and the blending device enter a standby mode, after the snapshot signal triggers the re-mosaic device and the blending device, the re-mosaic device and the blending device enter an activation mode.

\* \* \* \* \*